W. A. WHITNEY.

PUNCH.

APPLICATION FILED SEPT. 2, 1910.

Reissued Nov. 14, 1911. 13,313.

William A Whitney Inventor

Witnesses

Frank B. Woodew,

William Crichton Clarke by C. A. Snow & Co. Attorneys

COLUMBIA PLANOGRAPH CO., WASHINGTON, D. C.

UNITED STATES PATENT OFFICE.

WILLIAM A. WHITNEY, OF ROCKFORD, ILLINOIS, ASSIGNOR TO W. A. WHITNEY MANUFACTURING COMPANY, OF ROCKFORD, ILLINOIS.

PUNCH.

13,313. Specification of Reissued Letters Patent. Reissued Nov. 14, 1911.

Original No. 898,397, dated September 8, 1908, Serial No. 352,324. Application for reissue filed September 2, 1910. Serial No. 580,259.

*To all whom it may concern:*

Be it known that I, WILLIAM A. WHITNEY, a citizen of the United States of America, residing at Rockford, in the county of Winnebago, State of Illinois, have invented certain new and useful Improvements in Punches, of which the following is the specification.

Figure 3:
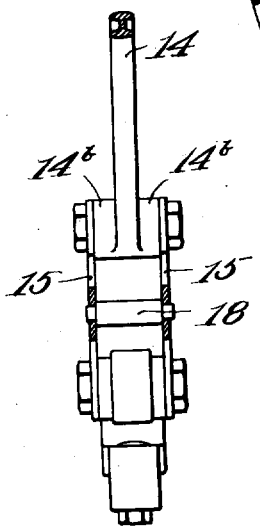
Figure 2:
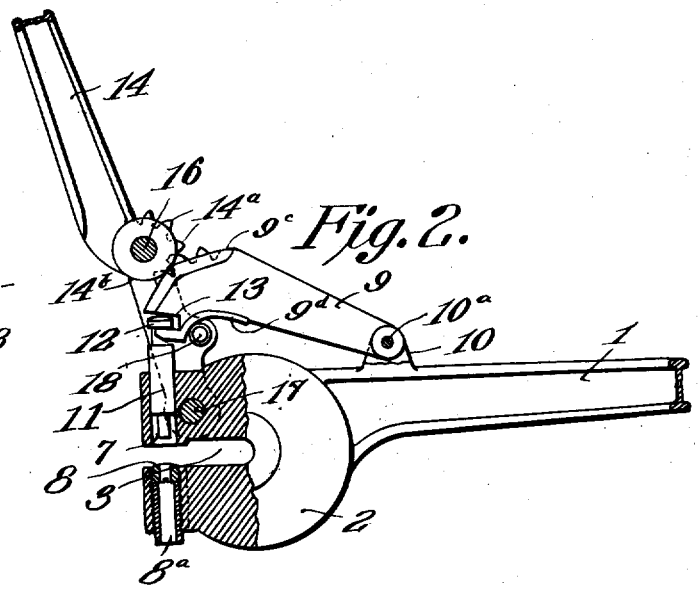
Figure 1:
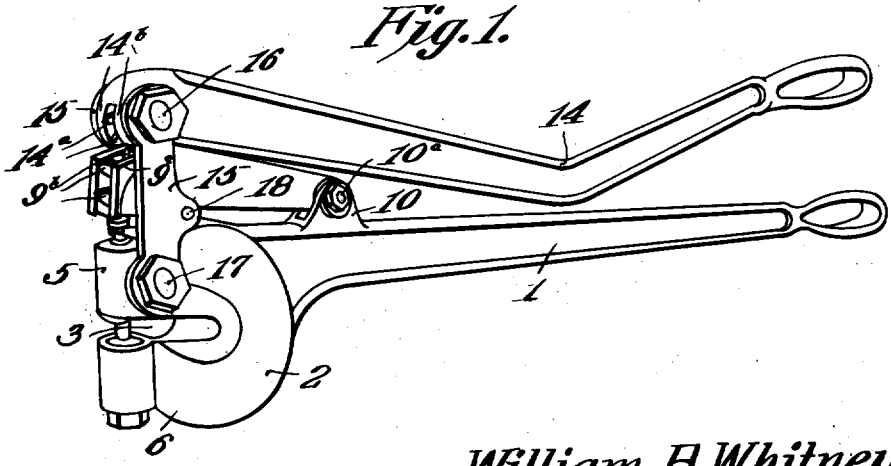

Referring to the accompanying drawings, which form a part of this specification, Figure 1 is an isometrical view of the punch with its handle closed. Fig. 2 is a side elevation of the same in vertical central longitudinal partial section with parts wanting and the handles open. Fig. 3 is a front end view of the punch with parts wanting and other parts broken away.

The object of my invention is the production of a punch of simple construction, efficient operation and one which may be readily transported from place to place; and it consists of certain new and useful features of construction and combinations of parts especially devised to those ends, all as hereinafter fully described and specifically pointed out in the claims.

Like reference characters indicate corresponding parts throughout the several views.

1 is a stationary handle provided at its forward end with a head 2, slotted at 3, for the reception of the metal to be punched. The head 2 is provided with an upper arm 5 and a lower arm 6, which lie, respectively, above and below the slot 3, the upper arm 5 being provided with a normally vertically disposed perforation 7, while the arm 6 has tapped thereinto, in vertical alinement beneath the perforation 7, a vertically adjustable female die 8 and a tubular locking-plug $8^a$ for securing the same in position therein.

9 is an arm-like member, pivoted at its rear end between ears 10, projecting upward from the handle 1 at the forward end of the same. This member 9, which is adapted to swing on its pivot $10^a$ toward and from the head 2, carries at its forward end the movable male member 11 of the punch which is provided at its upper end with a shouldered head 12, removably engaging a shouldered recess 13 formed in the member 9 near its outer end. During the movements of such member 9 toward and from the head 2, the male member 11 travels in and is guided by the perforation 7 and moves into and out of active position relative to the female die 8. The member 9 also has formed on the free end portion thereof gearing $9^b$ and cam surfaces $9^c$, and on the under surface thereof a cam surface $9^d$, for purposes to be explained hereinafter.

14 is the relatively movable handle of the punch and has gearing $14^a$ and rolls $14^b$ formed on the pivoted end thereof, the gearing $14^a$ coöperating with the gearing $9^b$ and the rolls $14^b$ with the cam surfaces $9^c$ on the member 9.

15 are a pair of links located on either side of the handles 1 and 14 and pivoted, as at 16, to the handle 14, and, as at 17, to the head 2, of the handle 1. The rear end of the handle 14 is bent at an angle relative to the handle 1.

18 is a roller mounted in and between the links 15 and coöperates with the cam surface $9^d$ on the member 9 to move the male die 11 out of and away from the female die 8, when the handle is swung from a closed to an open position.

During the operation of the punch if the handle is swung from a closed to an open position such movement will serve through the coöperation of the gearing $14^a$ thereon with the gearing $9^b$ on the member 9 and the roller 18 in the links 15 with the cam surface $9^d$ on such member 9, to raise the male member to its upper limit of travel or to its inactive position. If now the handle 14 is swung to a closed position, such movement will serve, through the coöperation of the gearing $14^a$ and rolls $14^b$ thereon with the gearing $9^b$ and the cam surfaces $9^c$ on the member 9 to depress the male member 11 to its lower limit of travel, or to its active position. It will thus be seen that the handle 14 must be swung from an open to a closed position and thereafter from a closed to an open position in order to cause the male die to perform a complete reciprocation or punching operation.

In Fig. 2 the handle 14 is shown in its normal open position with the punch 11 retracted. By moving the handle 14 still farther to the left until the teeth $14^a$ and rolls $14^b$ entirely clear the arm or lever 9, said lever can be lifted and moved to the right with the effect of withdrawing the punch 11 from the guide opening 7 so as to permit another punch to be easily and quickly inserted, it being only necessary to engage the head 12 of the new punch with the recess 13 and throw the lever 9 downward into position, at the same time guiding the new punch into the opening 7.

Having described the invention what I claim as new and desire to secure by Letters Patent is:

1. The combination with a stationary handle, of a member pivotally associated therewith, a die carried by the stationary handle, a coöperating die carried by the member, a relatively movable handle, links connecting the stationary and relatively movable handle, gearing and rolls on the pivoted end portion of the relatively movable handle, gearing and cam surfaces on the free end portion of the member cooperating respectively with the gearing and rolls on the relatively movable handle, said member being operable to move its die to an active position by swinging the relatively movable handle from an open to a closed position.

2. The combination with a stationary handle, of a member pivotally associated therewith, a die carried by the stationary handle, a coöperating die carried by the member, a relatively movable handle, links connecting the stationary and relatively movable handle, gearing on the pivoted end portion of the relatively movable handle, gearing on the free end portion of the member, a cam surface on the under side of the member and a roller mounted in the connecting links, the gearing on the relatively movable handle coöperating with the gearing on the member and the cam surface on the underside of the member cooperating with the roller in the links, said member being operable to move its die to an inactive position by swinging the relatively movable handle from a closed to an open position.

3. A punch comprising a main element made up of a head and a handle, the head having a pair of spaced arms, a punching tool slidable through one of said arms toward and from the other arm, a lever fulcrumed at one end on the said main element and connected at its free end with said punching tool, and an operating handle pivotally connected at its extreme end with said main element and engaging the free end of the lever for operating said punching tool.

4. A punch comprising a main element made up of a head and a handle, the head having a pair of spaced arms, a punching tool slidable through one of said arms toward and from the other arm, a lever fulcrumed at one end on said main element and detachably connected at its free end with said punching tool, and an operating handle pivotally connected at its extreme end with said main element and engaging the free end of said lever for operating said punching tool, the detachable connection between said lever and said punching tool permitting said punching tool to be removed when the handles of the punch are separated from each other.

5. A punch comprising a main element made up of a head and handle, the head having spaced arms, a punching tool slidable through one of said arms and having a shouldered head, a lever pivoted on said main element and detachably engaging the shouldered head of said punching tool at its free end, and an operating handle pivotally connected at its extreme end with said main element and engaging said lever for throwing it toward and from said main element.

6. In a metal working implement, the combination of the stationary arm, the swinging arm pivotally connected thereto, the operating lever having a link connection at its extreme end with said stationary arm, said operating lever being in engagement with the free end of said swinging arm, and a tool movably mounted in the stationary arm and engaged with and operated by said swinging arm.

7. In a metal working implement, the combination of the stationary element, a lever fulcrumed on said stationary element, an operating lever having a link connection at its extreme end with said stationary element and having a cam engagement with the free end of said lever, and a punching tool movable in said stationary element and connected with and operated by the free end of said lever.

8. In a metal working implement, the combination of the stationary element having fixed jaws, a metal working tool movable through one of said jaws, an operating handle having swinging fulcrum connected with said stationary element, a lever fulcrumed on said stationary element, said lever being in engagement at its free end with said operating handle, means connecting said lever with said metal working tool, and means interposed between said operating handle and the free end of said lever for moving the fulcrum of said operating handle so as to prevent any slip between said handle and said lever.

9. In a tool of the character set forth, the combination of a stationary element, an operating handle pivoted to swing about a movable axis, a lever fulcrumed on said stationary element and projecting toward the head thereof, the free end of said lever being in engagement with said operating handle, and guiding means connecting said operating handle with the free end of said lever for moving the axis of said operating handle in the same rotative direction as that in which said handle moves, substantially as described.

10. A stationary element having a movable tool thereon, and means for guiding the tool, an operating handle having a fulcrum connected with and movable relatively to the stationary element, a lever fulcrumed on the stationary element for operating said tool, said lever being separate from the means connecting the fulcrum of the operating handle with the stationary handle, the free end of said lever being connected with said tool.

11. A punch comprising a stationary element having fixed jaws, a tool movable through one of said jaws, an operating handle having a fulcrum connected with and movable relatively to the stationary element, a lever fulcrumed on the stationary element at one end and projecting at the other end toward said jaws, said lever being connected at its free end with said tool and engaging said operating handle, one of the engaging surfaces between said lever and said operating handle being a cam surface.

12. A punch comprising a stationary element having fixed jaws, at its outer end, a tool movable through one of said jaws, an operating handle having a fulcrum connected with and movable relatively to the stationary element adjacent the outer end thereof, a lever fulcrumed on said stationary element and having its free end extending toward the forward end of said stationary element, said free end of said lever being connected with said tool and engaging said operating handle, one of the engaging surfaces between said operating handle and said lever being a cam surface, and means for preventing slips between the lever and the handle.

13. A metal working implement comprising a stationary element provided with a movable tool, a lever fulcrumed at one end on said stationary element, and connected at the other end with said tool, and an operating handle arranged to move said other end of said lever toward and from said stationary element, said operating handle having a fulcrum movable relatively to the stationary element.

14. A metal working implement comprising a stationary element provided with a movable tool, a lever fulcrumed at one end on said element and connected at its free end with said tool, an operating handle arranged to move the free end of said lever toward and from said stationary element, said operating handle having a fulcrum located at its extreme end and movable in the arc of a circle relatively to the stationary element.

15. A metal working implement comprising a stationary element, having a movable tool, a lever fulcrumed at one end on said stationary element and detachably connected at its free end with said tool, and an operating handle having a fulcrum located at its extreme end and movably connected with said stationary element, said operating handle, adjacent its fulcrum, being in detachable engagement with the free end of said lever, whereby, when said operating handle is moved out of engagement with the said lever, said tool can be removed and replaced.

WILLIAM A. WHITNEY.

Witnesses:
JAMES A. MCPHAIL,
CHAS. H. KNAPP.

Copies of this patent may be obtained for five cents each, by addressing the "Commissioner of Patents, Washington, D. C."